Patented July 11, 1950

2,515,129

UNITED STATES PATENT OFFICE 2,515,129

LUBRICANT COMPOSITION

Eugene Lieber, New York, N. Y., and Aloysius F. Cashman, Bayonne, N. J., assignors to Standard Oil Development Company, a corporation of Delaware No Drawing. Application August 22, 1945, Serial No. 612,122

2 Claims. (Cl. 252—48.8)

This invention relates to the preparation of novel chemical condensation products particularly useful as poly-functional additives for waxy mineral lubricating oils.

It is already known that products having good E. P. (extreme pressure) lubricating properties can be made, for instance, by chlorinating kerosene or paraffin wax and reacting the resultant chlorinated hydrocarbon product with an alkaline polysulfide, as disclosed in U. S. Patent 2,124,598. However, such products have little, if any, value as pour depressors for waxy mineral lubricating oils.

It is one object of the present invention to make products which have both good E. P. lubricating properties and also good pour depressing properties. This primary object of the invention may be accomplished in several ways, one of which is to subject an E. P. agent, such as one made by the process described above, to a further chemical condensation as will be described hereinafter. Another object of the invention is to accomplish the somewhat comparable final result by using a different procedure.

The invention will first be described as applied to the use of an E. P. agent as a starting material.

The E. P. agent to be used may be considered as a sulfurized halogenated non-aromatic hydrocarbon, i. e., an aliphatic or cyclo aliphatic hydrocarbon. In general such products should contain about 10% to 50% of halogen, preferably about 25% to 35%, and should also contain about 2% to 20%, preferably 3% to 8%, sulfur. The product may be prepared by the methods referred to above, namely, chlorination of a petroleum hydrocarbon fraction such as kerosene or paraffin wax, to a chlorine content of about 25% to 50%, preferably about 30% to 40%, e. g., by passing chlorine through a liquid hydrocarbon at a temperature of about 175° to 200° F., and then sulfurizing the resultant chlorinated hydrocarbon by treating it with elemental sulfur or with an inorganic sulfide, such as sodium or other alkaline polysulfide, or a mixture thereof with sulfur and sodium hydroxide, or an organic sulfur, such as an alkali thiocarbonate or an alkali xanthate or an alkali thiocyanate or an alkyl and/or aryl mercaptan. Such sulfurizing treatment usually effects a partial reduction in the halogen content of the halogenated hydrocarbon being treated. Such a sulfurization may be carried out at a reflux temperature for a reaction time ranging between about ½ hour and 5 or 10 hours. Sodium chloride or other corresponding alkali halide forms and is then separated, and any solvent may be removed by distillation. For instance, isopropyl alcohol or other suitable solvents may be used to help effect good contact and reaction between the inorganic or organic sulfur compound, which may be an aqueous solution. The final E. P. product made, for instance, by chlorinating kerosene to about 35% chlorine content and then sulfurizing it with an isopropyl alcohol solution of an aqueous caustic soda and sodium hydrogen sulfide, containing free sulfur admixed therewith, at reflux temperature, separating resultant sodium chloride, distilling off the isopropyl alcohol, will contain about 33% of chlorine and about 7% of sulfur.

According to the preferred modification of the inventoin an E. P. agent made such as described above is then chemically condensed with an aromatic compound, preferably having less than 30 carbon atoms, such as naphthalene, by the use of a Friedel-Crafts catalyst, such as aluminum chloride or titanium tetrachloride, etc., using a sufficient reaction temperature to cause condensation of the E. P. agent to the aromatic nuclei by setting off hydrogen halide formed from chlorine or other halogen atoms under E. P. agents combining with a nuclear hydrogen atom from the aromatic compound. Instead of the preferred naphthalene, other aromatic compounds may be used, such as benzene, toluene, xylene, amyl benzene, diphenyl, anthracene, mixed petroleum aromatic fractions, or mixed coal tar aromatics, of various hydroxy and amino derivatives of aromatic hydrocarbons, e. g., phenol, cresol, butyl phenol, mixed petroleum phenols, naphthal, aniline, xylidine, etc., as well as other aromatic compounds, such as tetralin, stearophenone, low molecular weight aromatic resins, such as polymerized dehydro naphthalene, cumar, cumarones, indenes, copolymers of styrene and isobutylene, stylene-acrylonitrile, phenol-formaldehyde resins, etc. The special type of aromatic compound which may be used is one having the general formula $$M—Y—Ar—(X)_n$$

where M may represent hydrogen or a metal or a polyvalent metal having attached to some other organic radical, Y represents oxygen or a member of the sulfur family (i. e., sulfur, selenium or tellurium), Ar represents an aromatic nucleus which contains like or unlike substituents X, $n$ in number, replacing nuclear hydrogen, $n$ being at least 1. If M is a metal, it is preferably a polyvalent metal, such as barium, calcium, aluminum, cobalt, chromium, magnesium, manganese, nickel, lead, tin, zinc, copper, iron, cadmium, etc., although in some cases it may also be monovalent metals.

The substituent X may be organic, inorganic or both, but at least one such group should be an element of the sulfur family where a group is linked to Ar through such an element. The other substituents are preferably alkyl radicals or groups which may or may not contain one or more of the non-metallic elements belonging to group V, VI and VII of the periodic system, i. e., nitrogen, phosphorus, oxygen, sulfur and halogen, as in amino, nitro, phosphite, phosphate, hydroxy, alkoxy, sulfide, thioether, mercapto chloro groups and the like, provided that such substituent groups did not interfere with the desired Friedel-Crafts condensation of the aromatic compound with the E. P. agent. A preferred type of this particular kind of aromatic compound can be represented by the general formula

$$M[-Y-Ar(R)-]_2S$$

in which case the M may represent either two separate hydrogen atoms one attached to each of the two Y atoms, or two monovalent atoms, where a divalent metal is attached to each of the two different Y atoms. Several specific examples of this type of compound are

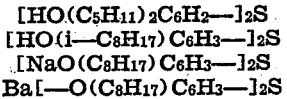

$$[HO(C_5H_{11})_2C_6H_2-]_2S$$
$$[HO(i-C_8H_{17})C_6H_3-]_2S$$
$$[NaO(C_8H_{17})C_6H_3-]_2S$$
$$Ba[-O(C_8H_{17})C_6H_3-]_2S$$

etc. Compounds such as those just described may readily be prepared by first making the desired alkyl phenol, treating the latter with sulfur chloride $SCl_2$, and finally replacing the phenolic hydrogen, if desired, by a metal. The corresponding compounds can also be prepared by using sulfur monochloride and $S_2Cl_2$ instead of $SCl_2$.

Carrying out the Friedel-Crafts condensation of the E. P. agent as previously described and the low molecular weight aromatic compound just described above, an inert solvent may be used, if desired, such as a refined kerosene or a heavy naphtha fraction or a highly chlorinated hydrocarbon, such as tetrachlorethane, dichlorbenzene, ethylene dichloride, etc. The temperature to be used should normally be within the approximate limits of room temperature and about 250° F. The best procedure is to mix the reactant and inert solvent, if one is used, and gradually add the catalyst, such as aluminum chloride, at room temperature, with stirring, and after initial reaction has subsided, the reaction mass may then be heated to the desired finishing temperature, preferably about 100° to 225° F., for a reaction time which may range from a few minutes up to 5 or 10 hours, depending partly upon the reaction temperature used and upon the amount of catalyst used, as well as the reactivity of the actual reactant used.

After the Friedel-Crafts condensation has been completed, the desired high molecular weight condensation products may be recovered in any desired manner, but the preferred procedure is to cool the reaction mixture, add an additional amount of inert solvent and then neutralize residual aluminum chloride catalyst by adding water, aqueous alcohol, caustic soda, etc., after which catalyst sludge should be settled and withdrawn, the solvent extracted and subjected to distillation under reduced pressure, e. g., by fire and steam up to about 600° F. to remove solvent and low boiling condensation products to leave the desired high molecular weight condensation products as distillation residue.

The resulting condensation products should generally have an average molecular weight of about 500 to 3,000, preferably about 700 to 1500, and it should usually contain about 10% to 30%, preferably about 5% to 15%, of halogen and also about 2% to 20%, preferably about 3% to 8%, of sulfur. This product is a sulfurized, halogenated, non-aromatic hydrocarbon condensation product with a low molecular weight aromatic compound. The product probably consists of a mixture of molecules containing at least one of each of these two primary constituents and perhaps as many as 2 to 5 of each of them. The high molecular weight condensation product is polyfunctional, that is, it has both E. P. properties and pour depressing properties, and may also have antioxidant and detergent properties if the aromatic compound with which the E. P. agent was condensed was one of the alkylated oxyaromatic sulfide or similar type which are represented by the formula $M-Y-Ar(X)_n$ previously described.

Although the preferred procedure of making the poly-functional condensation products of this invention is the one described above, alternative procedures may be used, for instance, if desired, an alkyl-aromatic pour depressor may first be produced by condensing a suitable non-aromatic hydrocarbon with an aromatic compound, then halogenating the non-aromatic portion of the condensation product, and finally sulfurizing the halogenated alkyl-aromatic pour depressor, to make the desired E. P. pour depressor. For instance, chlorinated paraffin wax having a chlorine content of from 10% to 25% or so may be condensed with suitable aromatic compounds, such as naphthalene, diphenyl, anthracene or some of the other aromatic compounds mentioned previously, the presence of a Friedel-Crafts catalyst, such as aluminum chloride, and preferably also the presence of a suitable inert solvent, such as a refined kerosene or tetrachlorethane, etc., then hydrolyzing and removing the catalyst and distilling the reaction product of a reduced pressure such as with fire and steam up to a temperature of about 600° F. to obtain the desired high molecular weight condensation product of distillation residue. This product is a pour depressor and may even also have viscosity index improving properties, particularly when made in the chlorinated paraffin wax having from 15% to 25% of chlorine and prepared by the detailed procedure described in U. S. Patent 2,339,493. Generally, the average molecular weight of this pour depressor per se will range from about 1,000 to 3,000 and preferably should be about 1,000 to 2,000. This pour depressor should then be chlorinated or otherwise halogenated to a halogen content of about 10% to 40%, under conditions favoring halogenation in the non-aromatic portion of the molecule, and finally the halogenated product should then be sulfurized according to the sulfurization procedure previously mentioned, in order to make the desired final polyfunctional product having pour depressing properties, E. P. properties and also, if desired, V. I. improving properties, and even also antioxidant or detergent properties if the aromatic compound used in the initial condensation step is one of the general type $M-Y-Ar(X)_n$ as previously described.

The objects, advantages and details of the invention will be better understood from a consideration of the following experimental data.

In this series of tests, two different E. P. agents were condensed with several different aromatic compounds, using aluminum chloride as catalyst and carrying out the condensation in either of two solvents, one a refined kerosene and the other a tetrachlorethane. E. P. agent No. 1 was made by chlorinating kerosene to about 38–40% Cl, and reacting the resultant chlorinated kerosene with excess sodium polysulfide in isopropyl alcohol solution, so that the final E. P. agent had a chlorine content of about 31 to 32% and a sulfur content of 6.5%. E. P. agent No. 2 was similarly made by chlorinating paraffin wax to a chlorine content of about 16–17% Cl, and then sulfurizing the same way, so that the final E. P. agent contained 13.8% chlorine and 3.1% sulfur.

*Example I*

The following proportions of reagents were used:

| | | |
|---|---|---|
| Naphthalene | grams | 300 |
| E. P. agent No. 1 | do | 250 |
| AlCl₃ | do | 200 |
| Kerosene as solvent | cc | 500 |

The solvent, naphthalene, and E. P. agent No. 1 were placed in the reactor (glass) equipped with mechanical stirrer, thermometer, and reflux condenser. The AlCl₃ was added slowly, while agitating and maintaining a temperature of about 100° F. over a period of 20 minutes. After the addition of the AlCl₃, the temperature was maintained at 150° F. and maintained thereat for 30 minutes additional. After cooling, additional solvent was added and the AlCl₃ neutralized by adding water. After settling, the aluminous sludge was withdrawn and discarded. The kerosene extract was washed further. The solvent and low-boiling products were removed by fire and steam distillation to 600° F. A bottoms product comprising 366 grams of a dark green viscous oil was obtained. Analysis showed it to contain 2.5% sulfur and 3.1% chlorine.

When 5% of this condensation product was added to a waxy oil, the pour point of which was +30° F., the pour point was found to be +15° F.

*Example II*

The following proportions of reagents were used:

| | | |
|---|---|---|
| Naphthalene | grams | 25 |
| E. P. agent No. 2 | do | 250 |
| AlCl₃ | do | 5 |
| Tetrachlorethane as solvent | cc | 250 |

All of the reactants were placed in a 1-liter round-bottom Pyrex flask equipped with a reflux condenser and refluxed (310° F.) for 1½ hours. After cooling and further dilution with solvent, the AlCl₃ was neutralized with water. The tetrachlorethane extract was washed with water and the solvent then removed by distillation under high vacuum (10 mm. Hg. pressure) to 350° F. bottoms temperature. A bottom yield of 210 grams of a blackish green oil was obtained as product.

Various concentrations of this condensation product, prepared as described above, were blended in a waxy-oil and the pour point determined by the regular A. S. T. M. procedure. The following data were obtained:

| | Pour point °F. |
|---|---|
| Original oil | +30 |
| Original oil+1.0% cond. product | −15 |
| Original oil+2.0% cond. product | −25 |
| Original oil+5.0% cond. product | Better than −35 |

*Example III*

The following proportions of reagents were used:

| | | |
|---|---|---|
| Naphthalene | grams | 50 |
| AlCl₃ | do | 50 |
| E. P. agent No. 1 | do | 250 |
| Kerosene as solvent | cc | 500 |

The procedure was the same as described under Example I.

A yield of 94 grams of a dark green oil was obtained as product. It showed the following analyses: 6.2% sulfur, 6.8% chlorine.

Various concentrations of this condensation product, prepared as described above, were blended in a waxy-oil and the pour point determined by the regular A. S. T. M. procedure. The following data were obtained:

| | Pour point °F. |
|---|---|
| Original oil | +30 |
| Original oil+5% cond. product | +10 |
| Original oil+10% cond. product | −10 |

*Example IV*

The following proportions of reagents were used:

| | | |
|---|---|---|
| Naphthalene | grams | 25 |
| E. P. agent No. 2 | do | 250 |
| AlCl₃ | do | 10 |
| Tetrachlorethane as solvent | cc | 250 |

The procedure used in Example II was followed exactly. A yield comprising 186 grams of a blackish-green oil was obtained as product.

Various concentrations of this condensation product, prepared as described above, were blended in a waxy-oil and the pour point determined by the regular A. S. T. M. procedure. The following data were obtained:

| | Pour point °F. |
|---|---|
| Original oil | +30 |
| Original oil+1% cond. product | −25 |
| Original oil+2% cond. product | −30 |
| Original oil +5% cond. product | Better than −35 |

*Example V*

The following proportions of reagents were used:

| | | |
|---|---|---|
| E. P. agent No. 1 | grams | 250 |
| Phenol | do | 220 |
| AlCl₃ | do | 200 |
| Kerosene as solvent | cc | 500 |

The procedure used in Example I was followed exactly.

A yield comprising 147 grams of a dark green oil was obtained as product.

Various concentrations of this condensation product, prepared as described above, were blended in a waxy-oil and the pour point determined by the regular A. S. T. M. procedure. The following data were obtained:

| | Pour point °F. |
|---|---|
| Original oil | +30 |
| Original oil+5% cond. product | +25 |
| Original oil+10% cond. product | −5 |

The above data show, particularly in Examples II and IV, that potent pour depressors can be made by Friedel-Crafts condensation of a sulfurized chlorinated non-aromatic hydrocarbon with an aromatic compound. It is significant to note that these condensation products become increasingly more potent in pour depressing properties when used in larger concentrations even up to 10%, whereas some commercial pour depressors of the past are not as potent when used in 10% concentrations as they are when used in a low concentration of 1 or 2% or less. It should also be noted that much better pour depressing results were obtained in Examples II and IV than in the other three examples, and it is believed that the chief reasons for these superior results is that the E. P. agent was made from a long chain aliphatic hydrocarbon, namely, paraffin wax, instead of kerosene. In other words, for the purposes of the present invention, it is preferred that the E. P. agent starting material should be made from a non-aromatic hydrocarbon having a long aliphatic chain, preferably more than 10 carbon atoms, and better still more than 15 carbon atoms.

It is not intended that the invention be limited to the specific materials which have been recited merely for the sake of illustration but only by the appended claims in which it is intended to claim all novelty inherent in the invention as well as all modifications coming within the scope and spirit of the invention.

What is claimed is:

1. Composition consisting essentially of a waxy mineral lubricating oil having dissolved therein at least a pour depressing amount of a Friedel-Crafts condensation product of a sulfurized highly chlorinated paraffin wax with naphthalene, said condensation product having an average molecular weight of between 500 and 3000, and containing about 10 to 30% of chlorine and about 2 to 20% sulfur.

2. A composition consisting essentially of waxy mineral base lubricating oil containing in solution about 1 to 10%, by weight, of an oil-soluble, Friedel-Crafts condensation product of a sulfurized chlorinated petroleum hydrocarbon fraction of the kerosene to paraffin wax boiling range with an aromatic hydrocarbon compound having less than 30 carbon atoms, said condensation product having an average molecular weight between 500 and 3000, being substantially non-volatile below 600° F., and containing between 10 and 30% by weight of chlorine and 2 to 20% of sulfur.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| 2,258,806 | Pier | Oct. 14, 1941 |
| 2,316,086 | MacLaren | Apr. 6, 1943 |
| 2,348,080 | Lincoln | May 2, 1944 |